UNITED STATES PATENT OFFICE.

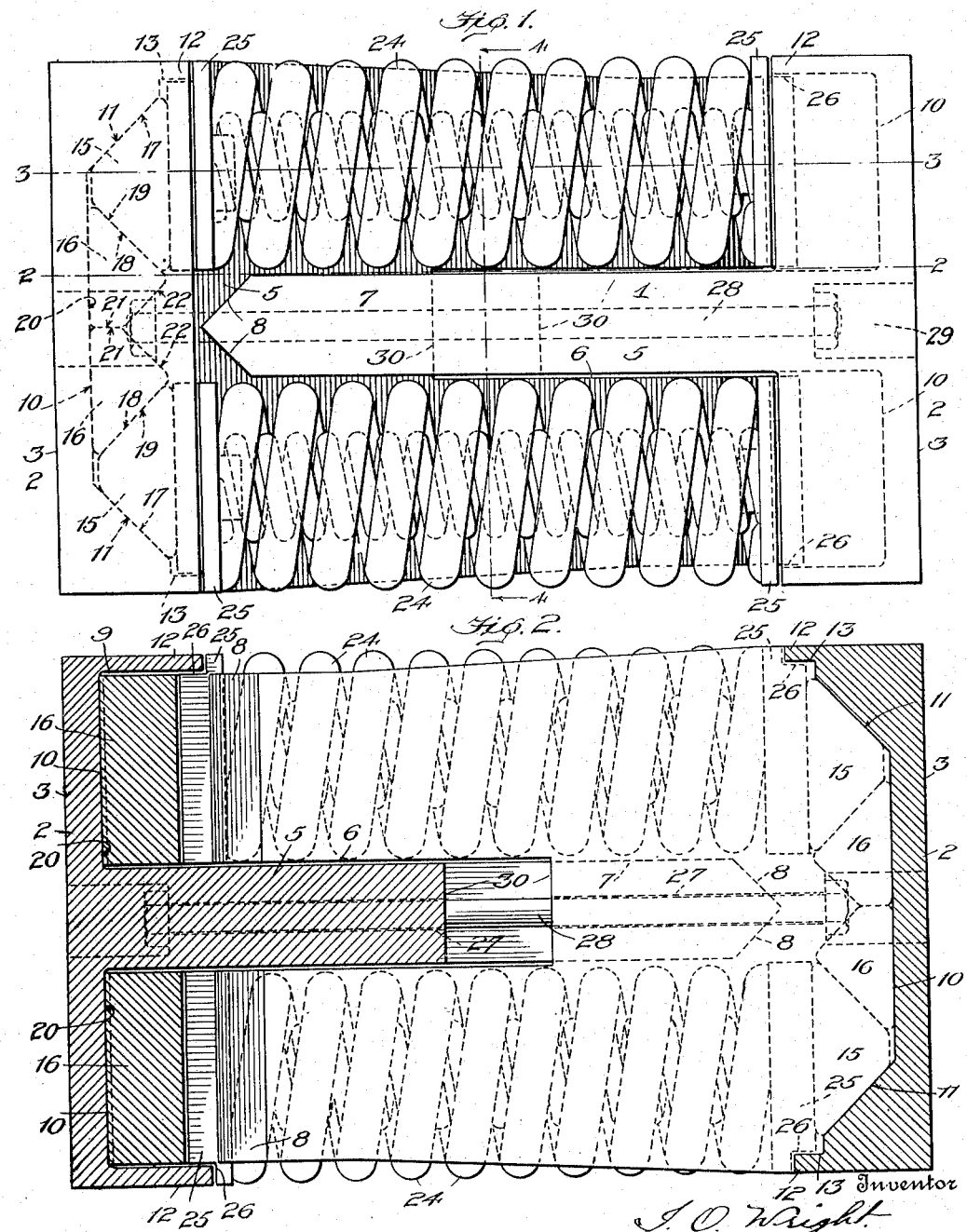

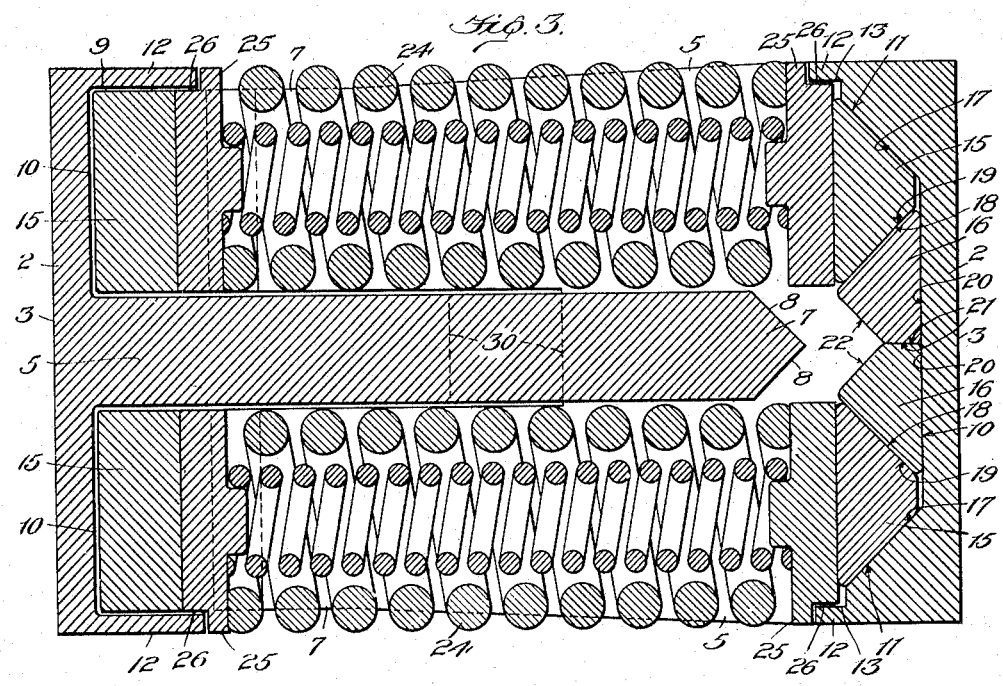
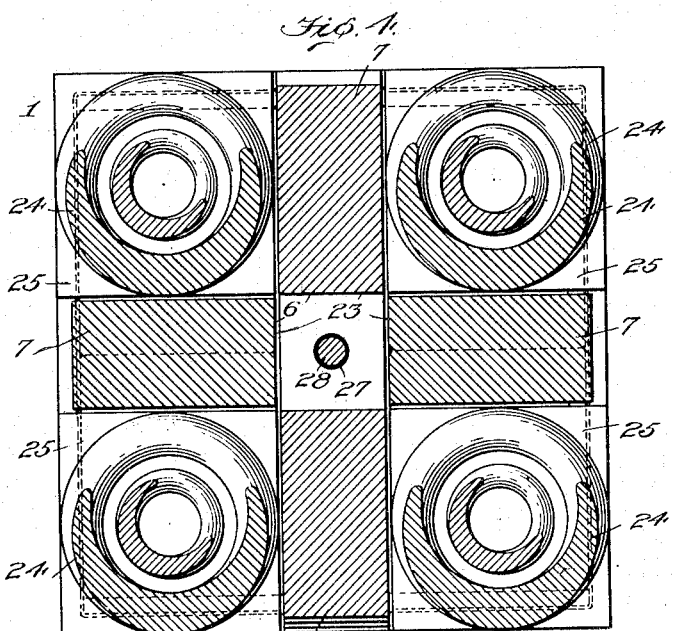

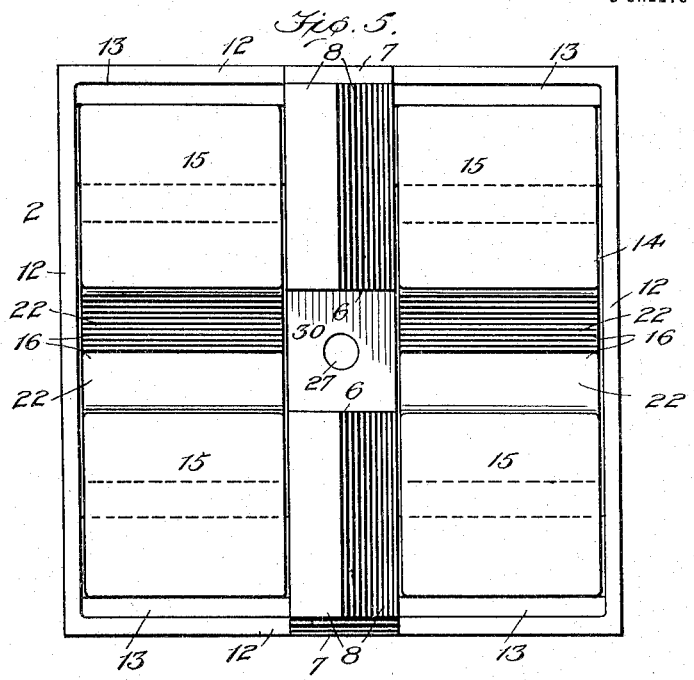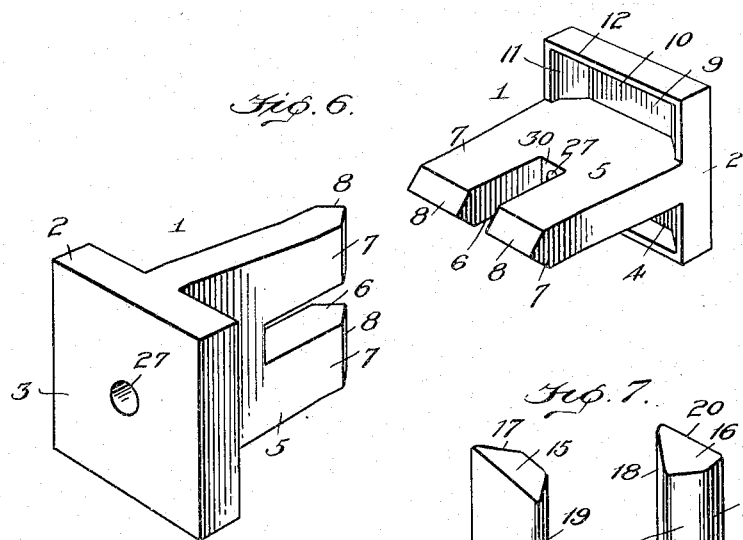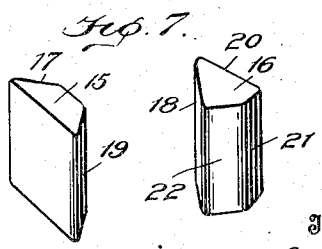

IRA O. WRIGHT, OF BALTIMORE, MARYLAND.

FRICTION DRAFT-RIGGING.

1,358,489.  Specification of Letters Patent.  Patented Nov. 9, 1920.

Application filed May 20, 1918. Serial No. 235,480.

*To all whom it may concern:*

Be it known that I, IRA O. WRIGHT, a citizen of the United States, residing at Baltimore, State of Maryland, have invented certain new and useful Improvements in Friction Draft-Rigging; and I do hereby declare the following to be a full, clear, and exact description of the invention, such as will enable others skilled in the art to which it appertains to make and use the same.

The invention relates to draft rigging for railway cars, and more particularly to that type of those devices commonly called friction draft rigging. Its primary object is to provide a combined spring and friction mechanism arranged to have a resistance directly proportional to the load placed thereon, and to have a full and free release action when relieved from the load. To this end, the main feature of my invention, generally stated, consists in providing a pair of counterpart friction members each furnished with a plurality of friction producing means and spring mechanism interposed between the said counterpart members and adapted to be compressed by a movement of either of said members toward the other.

Another feature of my invention, consists in providing each friction member with a plurality of seats or housings each adapted to receive a plurality of friction blocks, and consists in arranging the friction members with respect to each other so that the friction blocks of one friction member are operated by the opposite friction member.

Another feature of my invention consists in arranging the friction mechanism so as to have a primary or initial action against the spring members only and to provide means whereby the friction mechanism is brought into action to resist shocks and blows in excess of the capacity of the spring members alone.

Another feature of my invention consists in providing means to limit the movement of one counterpart member toward the other, the said means adapted to form a rigid column extending from one friction member to the other so as to thereby transmit excessive shocks to the car underframe without damage to the friction or spring mechanism.

There are other features of the invention as will appear from a more detailed description of the device which has been chosen to illustrate my invention when taken in connection with the accompanying drawings, in which—

Figure 1 is a view in side elevation of a friction draft rigging embodying my invention.

Fig. 2 is a longitudinal sectional view taken on the line 2—2 of Fig. 1.

Fig. 3 is a longitudinal sectional view taken on the line 3—3 of Fig. 1.

Fig. 4 is a vertical cross section of the device shown in Fig. 1, taken on the line 4—4 thereof.

Fig. 5 is an end elevation of one of the counterpart friction members showing the wedging mechanism and friction mechanism associated therewith.

Fig. 6 is a perspective view of the two counterpart friction members showing the manner of assembling, and Fig. 7 is a perspective view of a pair of coacting wedging friction blocks.

Throughout the specification and drawings, like parts are designated by like reference characters.

The main friction members 1, 1 are counterparts or duplicates of each other, so it will be only necessary to describe one of these friction members in detail. The said friction member 1 comprises a plate 2, one face 3 of which is adapted to contact the drawbar stops on the car underframe, and to serve as a follower for the draft rigging. On its opposite face 4 the said plate is provided with a longitudinally extending centrally arranged tongue or plunger 5 which preferably extends across the face 4 from edge to edge. The said plunger is preferably of slightly less width adjacent its outer end than the width of the plate 2, and is also provided adjacent its outer or free end with a slot or opening 6, which is adapted to divide the free end of the plunger 5 into a pair of projecting arms 7, 7, the end faces of which are beveled or wedge shaped, as shown at 8. On opposite sides of the said tongue or plunger 5 the face 4 is provided with recesses or friction block seats 9, 9 each of which comprises a base or floor 10 provided at opposite ends with outwardly directed inclined portions 11, 11. These inclined portions 11 terminate short of the outer edges of the flange 12 which surrounds three sides of each recess 9. The inclined portions 11, 11 are also preferably spaced inwardly from the adjacent portions of the flange 12 to thereby form offset seats 13. Within each recess 9 there is provided a friction mechanism 14 which may and preferably does comprise a plurality of pairs of wedging friction blocks 15 and 16, the wedging blocks 15 each being provided with a wedging or inclined face 17 adapted to contact with the adjacent inclined portions of the recess.

The intermediate pair of wedging blocks 16 are each provided with a wedging face 18 to engage the corresponding wedging face 19 of the adjacent block 15 and with a friction face 20 to engage the floor 10 of the recess 9. The adjacent faces of the block 16 are provided with flat contacting faces 21 and diverging faces 22, the angle of the said faces 22 being equal to the angle of the wedge shaped faces 8 of the plunger 5.

The main friction members 1 are assembled with their respective plungers 5 at right angles to each other so as to permit the arms 7 of each plunger to straddle the portion of the opposite plunger in rear of the slot 6 thereof. As will be noted from Fig. 4 the friction members when intermeshed form a cross-shape member 23. After the members 1 are intermeshed or connected, the friction devices 14 are inserted within the recesses 9 and then the springs 24 and the spring followers 25 are inserted between the opposite pairs of friction devices 14. The outer faces of the followers 25 are adapted to bear against the outer faces of the wedging blocks 15. Each follower 25 is provided with an undercut portion 26 which is adapted to engage the flange 12 above the seats 13 to hold the followers from outward movement during the operation of the device. To maintain the draft rigging in assembled position and to provide means whereby the springs may be placed under any desired degree of initial compression, the friction members 1 are provided with a centrally arranged bolt opening 27 through which the bolt 28 extends. The outer faces 2 of the members 1 are provided with recesses 29 adapted to receive the head or nut of the said bolt 28.

The faces 30 of the plungers 5, formed by the bottom walls of the recesses 6 are adapted to contact to limit the approach of the members 1. When these faces are in contact the load placed on one of the members 1 is transmitted to the other member through a solid column. This construction not only serves to prevent damage to the springs and friction mechanism but also centralizes the load at the center of the members 1, and owing to the shape of their bases the plungers 5 distribute this load evenly across the entire face 3 of each member.

When assembled, the wedging faces 8 of the plungers 5 are preferably spaced from the faces 22 of the wedging block 16 to thereby provide a predetermined spring action before the friction devices are brought into operation. The amount of this spring action can be regulated by shortening or lengthening the plungers 5. It has been found, however, that a free movement of approximately two inches of the plungers when used in conjunction with 45° angle wedging blocks provides a draft rigging of the highest capacity.

It will be obvious to those skilled in the art that the capacity of any particular rigging of the type designed may be altered by omitting one or more of the friction devices 14.

Attention is directed to the fact that as shown the wedging faces 8 of each plunger are adapted to contact the faces 22 of the adjacent friction blocks at the same time so that on a movement in excess of the spring capacity all of the sets of friction devices 14 will be simultaneously brought into action, and the spring members will be compressed from both ends.

Having now described my invention, although it is to be understood that by the foregoing description I do not intend to limit the scope thereof, since what I claim and desire to secure by Letters Patent is:

1. In a draft rigging, the combination with a plurality of friction members, of a plurality of sets of friction devices carried by each member and adapted to coöperate therewith, and means on one of said members for operating one of the friction devices on the other of the said members.

2. In a draft rigging, the combination with a plurality of friction members, of a plurality of sets of friction devices carried by each of said members, and means carried by one of said members for operating the sets of friction devices on the other of the said members.

3. In a draft rigging, the combination with a plurality of friction members, of a plurality of sets of friction devices carried by each of said members, each of said friction devices being adapted to frictionally engage both of said friction members.

4. In a draft rigging, the combination with a plurality of friction members, of a plurality of independent sets of transversely movable friction devices carried by each of said members, each of said friction devices being adapted to frictionally engage both of said friction members.

5. In a draft rigging, the combination with a plurality of friction members, of a plurality of sets of friction devices carried by each member and adapted to coöperate therewith and with the other member, and interengaging friction members carried by the first-named friction members and adapted to operate the friction devices on the opposing friction member.

6. In a draft rigging, the combination with a plurality of friction members, each of which is provided with a plurality of ways or grooves, of a plurality of sets of friction devices, one of which is adapted to be seated in each of the said grooves, means carried by the friction members for operating the friction devices carried by the other friction member, said means being adapted to limit the travel of the said friction members.

7. In a draft rigging, the combination with a plurality of friction members, of a plurality of sets of transversely movable friction devices carried by each of said members, each of said friction devices being adapted to frictionally engage both of said friction members, and means whereby said friction devices come into operation after a preliminary movement of the said friction members.

In testimony whereof I affix my signature.

IRA O. WRIGHT.